United States Patent [19]

Honeycutt et al.

[11] Patent Number: 4,763,361
[45] Date of Patent: Aug. 9, 1988

[54] SYSTEM AND DEVICE FOR RECOGNITION OR IFF USE

[75] Inventors: Thomas E. Honeycutt, Somerville; Thomas G. Roberts, Huntsville, both of Ala.

[73] Assignee: The United States of America as represented by the Secretary of the Army, Washington, D.C.

[21] Appl. No.: 835,858

[22] Filed: Feb. 13, 1986

[51] Int. Cl.$^4$ .............................................. H04B 9/00
[52] U.S. Cl. ...................................... 455/605; 342/45
[58] Field of Search ......................... 342/6, 7, 44, 45; 455/605

[56] References Cited

U.S. PATENT DOCUMENTS

| | | | |
|---|---|---|---|
| 2,917,739 | 12/1969 | Halpern | 342/6 |
| 3,311,915 | 3/1967 | Mori | 342/6 |
| 4,064,434 | 12/1977 | Waksberg | 455/605 |
| 4,570,062 | 2/1986 | Tsumura et al. | 455/605 |

OTHER PUBLICATIONS

Institute of Radio Engineers Convention Record (vol. 4), Part 8, 1956, pp. 89, 92–96, "Enhancement of Aircraft Radar Return by Use of Airborne Reflectors and Circular Polarization", Joseph Panasienicz.

Primary Examiner—Robert L. Griffin
Assistant Examiner—Leslie Van Beek
Attorney, Agent, or Firm—Freddie M. Bush; Robert C. Sims

[57] ABSTRACT

The IFF System consists of an unpolarized light source like an infrared laser or a short wavelength radar. On a friendly target, a wire grid polarizer is mounted so that the polarization can be varied. Mounted to the back of the grid is a corner reflector which sends the signal right back on itself and utilizes the principle of optical enhancement so that the return signal is collomated and diffraction limited. A wire grid polarization analyzer is also mounted so as to be rotatable and is mounted in front of a detector for receiving signals reflected from the target.

5 Claims, 1 Drawing Sheet

SYSTEM AND DEVICE FOR RECOGNITION OR IFF USE

DEDICATORY CLAUSE

The invention described herein may be manufactured, used, and licensed by or for the Government for governmental purposes without the payment to us of any royalties thereon.

BACKGROUND OF THE INVENTION

Ships use red and green lights to indicate the left- and right-hand sides of the ship. By observing these lights, a captain can tell if a ship is approaching him or traveling in the same direction. These devices depend on being able to see in the visible part of the spectrum which, of course, is sometimes limited to very short ranges. During these times, the ships are usually visible to all weather radar and to some lasers in the near and far infrared. The invention disclosed here consists of a passive part which may be mounted on ships and an active part that is used for making observations. The same system may also be used by the military for IFF (Identify - Friend or Foe) purposes in many different scenarios, and it is for this purpose that the system is to be developed. Here, it is desirable to interrogate a target in as unobtrusive a manner as possible; and the return signal must be coded so as to indicate "friend." It is an object of this disclosure to provide a device which uses a programmable polarization of the return light wave for this purpose.

SUMMARY OF THE INVENTION

The IFF System consists of an unpolarized light source like an infrared laser or a short wavelength radar. On a friendly target, a wire grid polarizer is mounted so that the polarization can be varied. Mounted to the back of the grid is a corner reflector which sends the signal right back on itself and utilizes the principle of optical enhancement so that the return signal is collomated and diffraction limited. A wire grid polarization analyzer is also mounted so as to be rotatable and is mounted in front of a detector for receiving signals reflected from the target. Here, it is desirable to interrogate a target in as unobtrusive a manner as possible; and the return signal must be coded so as to indicate "friend." It is an object of this disclosure to provide a device which uses a programmable polarization of the return light wave for this purpose.

DETAILED DESCRIPTION OF THE BEST MODE AND PREFERRED EMBODIMENT

Figure 1:
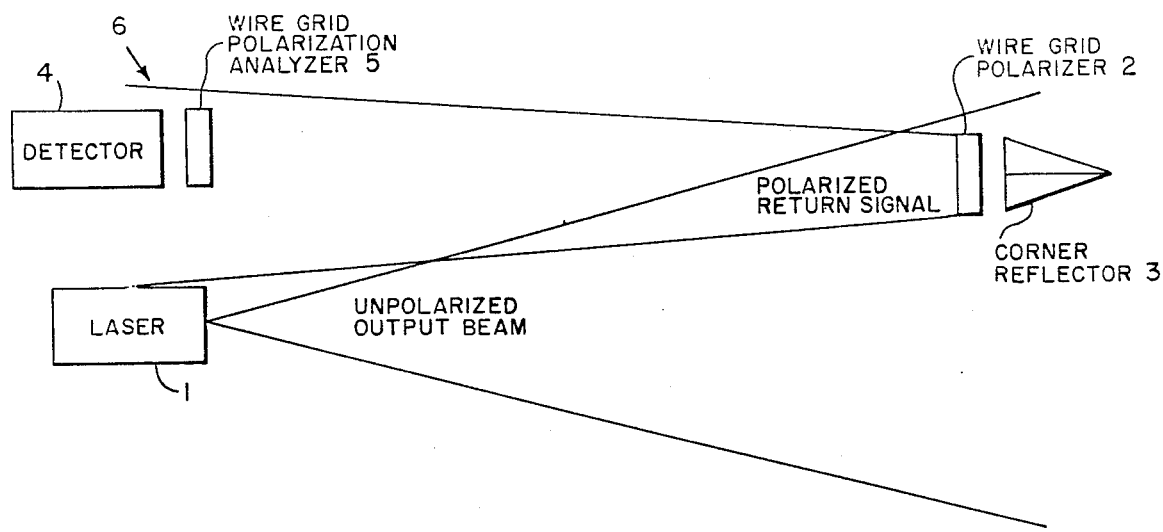
FIG. 1 is a schematic illustration of the IFF System.
Figure 2:
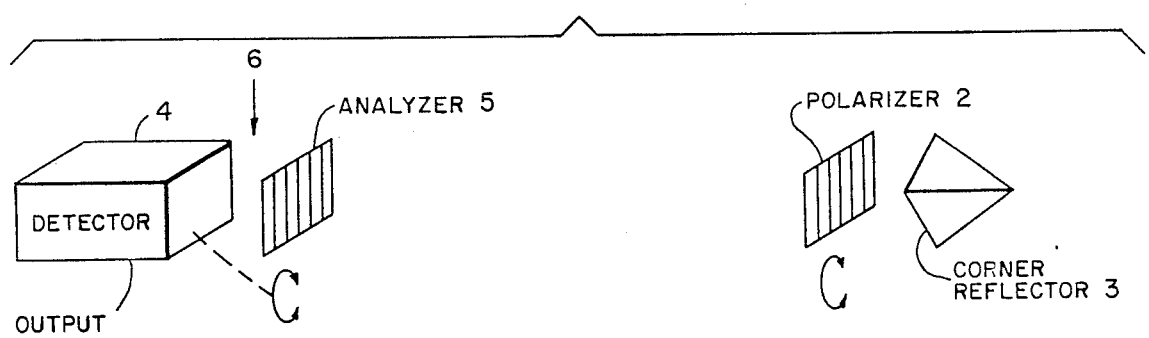
FIG. 2 is a schematic illustration of the polarized reflector and polarization analyzer detector.

The IFF System, shown in the figures, consists of a light source 1 like an infrared laser or a short wavelength radar; a wire grid polarizer 2 mounted so that the polarization can be varied (see AMPC 4326) the polarizer 2 is mounted in the front of a corner reflector 3 which sends the signal right back on itself and utilizes the principle of optical enhancement so that the return signal is collomated and diffraction limited. A detector 4 receives the return signal. A wire grid polarization analyzer 5 is also mounted as in AMPC 4326 so as to be rotatable and is mounted in front of 5 as detector 4.

Since a friendly target will reflect the signal with optical enhancement, a low power electromagnetic generator 1 can be used to interrogate the target. In this way the source 1 is less likely to be detected by an unfriendly target.

In operation when an object (ship, tank, plane troops, etc.) is to be interrogated, it is illuminated by laser 1. If it is a friend, then the signal which was sent out unpolarized will be received by the target, linearly polarized by its wire grid polarizer 2, and reflected back on itself by its corner reflector. This return signal is received by the interrogator 6 and analyzed for its polarization properties. Of course, the polarization analyzer is preset to that which a "friend" would be using for that day or part of a day. If there is no or little return from a known target (no corner reflector), or if the return is unpolarized (no polarizer), then the object is "foe." If the return is linearly polarized (polarizer 2 is at wrong angle, etc.) but in the wrong direction, then the object is still "foe" (but I would be careful becauses it would be very unusual for an unpolarized beam to return linearly polarized).

The analyzer 5 of the interrogator will rotate in a known manner so that the detector will know the polarization angle (if any) of the return signal. Any of the well known devices can be used (or connected to) for detector 4 so as to give a friend or foe output according to preset parameter.

The corner reflector 3 also affects the polarization and exact details of this effect for light arriving from any angle is still not known theoretically. The light is reflected from up to three surfaces and, in general, with three different angles of incident. However, since we are using metal surfaces for our corner reflector, the effect of the three reflections is to tend to cause a linearly polarized beam to be reflected with the polarization being slightly elliptical. When this beam then passes back through the wire grid polarizer 2, there is only a small loss of signal which is insignificant in this application. For any angle of arrival of the output beam, the relationship of the reflectors tend to compensate and leave the polarization nearly unchanged (except for being flipped 180°).

Note that the corner reflector or a more complicated optic like a telescope is necessary. A plane mirror behind the polarizer would not work because it does not allow for the optical enhancement and the probability of it being lined up sufficiently well is nearly zero.

When used for ships in peacetime, we would use two systems and return the beam polarized vertically for, say, left and horizontally polarized for right.

We claim:

1. In a system for identifying whether the target object is a friend or foe, the improvement comprising a first generating means for generating an unpolarized output beam which is sent to an object to be identified, reflecting means mounted on friendly objects whereby the unpolarized output beam will be polarized and reflected, an interrogator means for receiving reflected energy from said object, said interrogator means having a polarization anlayzer for detecting whether the return signal is polarized or unpolarized and therefore determining whether the object is a friend of foe.

2. A system as set forth in claim 1 wherein said reflecting means is a corner reflector with a polarization device mounted between said corner reflector and said generating means.

3. A system as set forth in claim 2 wherein said generating means is a laser, said unpolarized output beam is a laser beam, and said polarization device on said object is a wire grid polarizer which can be rotated so as to reflect a predetermined angle of polarization back toward said interrogator.

4. A system as set forth in claim 1 wherein said reflecting means is a collimating device which electromagnetically enhances the reflected energy.

5. A system as set forth in claim 4 wherein said interrogator means is located such that it will receive the reflected energy enhanced by the collimating device.

* * * * *